US010296064B2

(12) United States Patent
Piipponen et al.

(10) Patent No.: US 10,296,064 B2
(45) Date of Patent: May 21, 2019

(54) REDUCTION OF POWER CONSUMPTION IN WIRELESS COMMUNICATION TERMINALS

(75) Inventors: Antti Piipponen, Tampere (FI); Aarno Pärssinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1067 days.

(21) Appl. No.: 11/664,483

(22) PCT Filed: Oct. 15, 2004

(86) PCT No.: PCT/FI2004/000617
§ 371 (c)(1),
(2), (4) Date: Mar. 30, 2007

(87) PCT Pub. No.: WO2006/040390
PCT Pub. Date: Apr. 20, 2006

(65) Prior Publication Data

US 2008/0108397 A1 May 8, 2008

(51) Int. Cl.
*H04W 52/02* (2009.01)
*G06F 1/32* (2006.01)
(Continued)

(52) U.S. Cl.
CPC ............ *G06F 1/3215* (2013.01); *G06F 1/325* (2013.01); *H04W 52/0245* (2013.01);
(Continued)

(58) Field of Classification Search
USPC .......................................................... 455/574
See application file for complete search history.

(56) References Cited

U.S. PATENT DOCUMENTS 5,949,776 A 9/1999 Mahany et al.
6,108,542 A 8/2000 Swanchara et al.
(Continued)

FOREIGN PATENT DOCUMENTS

EP 1199842 A2 4/2002
EP 1530316 A1 5/2005
(Continued)

OTHER PUBLICATIONS

N. Choi et al.; "Multi-Channel MAC Protocol for Mobile Ad Hoc Networks"; IEEE 58th Vehicular Technology Confererence, VTC 2003—Fall; Oct. 2003; vol. 2; pp. 1379-1382.
(Continued)

*Primary Examiner* — Steven S Kelley
(74) *Attorney, Agent, or Firm* — Harrington & Smith

(57) ABSTRACT

The invention relates to a mechanism for decreasing power consumption in a wireless terminal intended for a communication system where availability of a common air medium is to be determined by the terminal prior to transmission. The terminal selects at least one communication device as a communicating peer and adjusts receiver performance based on received signal strength and optionally other parameters measured from at least one of the at least one wireless communication device, the receiver performance being adjusted for listening to the at least one wireless communication device with reduced power consumption. The terminal further generates an indication when its own transmission is approaching and readjusts the receiver performance for determining the availability of the common air medium at a performance level enabling detection of devices that may be disturbed by said own transmission.

36 Claims, 6 Drawing Sheets

(51) Int. Cl.
*G06F 1/3215* (2019.01)
*G06F 1/3234* (2019.01)

(52) U.S. Cl.
CPC ....... *H04W 52/0219* (2013.01); *Y02D 70/142* (2018.01); *Y02D 70/144* (2018.01); *Y02D 70/22* (2018.01)

(56) References Cited

U.S. PATENT DOCUMENTS

| | | | | |
|---|---|---|---|---|
| 6,112,081 | A * | 8/2000 | Namura et al. | 455/424 |
| 6,240,080 | B1 | 5/2001 | Okanoue et al. | |
| 6,498,926 | B1 | 12/2002 | Ciccarelli et al. | |
| 6,542,517 | B1 | 4/2003 | Giacalone | |
| 6,647,273 | B2 * | 11/2003 | Parssinen et al. | 455/522 |
| 6,766,143 | B1 | 7/2004 | Beckwith | |
| 6,895,255 | B1 | 5/2005 | Bridgelall | |
| 6,993,042 | B1 * | 1/2006 | Akatsuka | H04L 12/4035 370/230 |
| 7,023,824 | B2 * | 4/2006 | Khullar | 370/337 |
| 7,054,329 | B2 | 5/2006 | Cervello et al. | 370/447 |
| 7,164,671 | B2 | 1/2007 | del Prado | |
| 7,171,179 | B2 * | 1/2007 | Zhou | 455/226.2 |
| 7,299,021 | B2 * | 11/2007 | P rssinen et al. | 455/226.1 |
| 7,304,969 | B2 * | 12/2007 | Ryan et al. | 370/332 |
| 7,305,004 | B2 | 12/2007 | Sherman | |
| 7,315,524 | B2 | 1/2008 | Ohmi et al. | |
| 7,463,644 | B2 * | 12/2008 | Zhu et al. | 370/445 |
| 7,515,557 | B1 * | 4/2009 | Bims | 370/315 |
| 7,634,290 | B2 * | 12/2009 | Kelton et al. | 455/522 |
| 7,664,129 | B2 | 2/2010 | Takagi et al. | |
| 7,672,254 | B2 | 3/2010 | Kim et al. | 370/256 |
| 7,742,443 | B2 | 6/2010 | Wentink | |
| 7,751,424 | B2 | 7/2010 | Nagai et al. | |
| 7,774,495 | B2 * | 8/2010 | Pabla | H04W 8/005 455/432.2 |
| 8,107,424 | B2 | 1/2012 | Li et al. | |
| 2002/0136183 | A1 | 9/2002 | Chen | |
| 2002/0163933 | A1 | 11/2002 | Benveniste | |
| 2002/0196771 | A1 | 12/2002 | Vij et al. | |
| 2003/0053437 | A1 | 3/2003 | Bahl et al. | |
| 2003/0054818 | A1 | 3/2003 | Bahl et al. | |
| 2003/0078007 | A1 | 4/2003 | Parssinen et al. | 455/67.1 |
| 2003/0124999 | A1 | 7/2003 | Parssinen et al. | 455/226.1 |
| 2003/0128684 | A1 | 7/2003 | Hirsch et al. | |
| 2003/0133469 | A1 | 7/2003 | Brockmann | |
| 2003/0137989 | A1 * | 7/2003 | Nagai | H04L 12/40032 370/455 |
| 2003/0144020 | A1 | 7/2003 | Challa et al. | |
| 2004/0063458 | A1 | 4/2004 | Hori et al. | |
| 2004/0128574 | A1 | 7/2004 | Ricci et al. | |
| 2004/0218548 | A1 * | 11/2004 | Kennedy | H04L 1/1685 370/254 |
| 2004/0229566 | A1 | 11/2004 | Wang | |
| 2004/0258051 | A1 | 12/2004 | Lee | |
| 2005/0020236 | A1 * | 1/2005 | Mauney | H04M 1/72519 455/403 |
| 2005/0025104 | A1 | 2/2005 | Fischer et al. | |
| 2005/0100029 | A1 | 5/2005 | Das | |
| 2005/0111401 | A1 * | 5/2005 | Terry | H03G 3/3052 370/328 |
| 2005/0122940 | A1 | 6/2005 | Nian | |
| 2005/0124329 | A1 | 6/2005 | Yadav | |
| 2005/0128970 | A1 * | 6/2005 | Tsien et al. | 370/315 |
| 2005/0135303 | A1 | 6/2005 | Cromer et al. | |
| 2005/0165916 | A1 | 7/2005 | Cromer et al. | |
| 2005/0174962 | A1 | 8/2005 | Gurevich | |
| 2005/0201308 | A1 | 9/2005 | Sekiya et al. | |
| 2005/0226183 | A1 | 10/2005 | Penumetsa | |
| 2006/0029073 | A1 | 2/2006 | Cervello et al. | 370/389 |
| 2006/0050729 | A1 | 3/2006 | Chen | |
| 2006/0073847 | A1 | 4/2006 | Pirzada et al. | |
| 2006/0111045 | A1 | 5/2006 | Orlassino et al. | |
| 2006/0194600 | A1 | 8/2006 | Palin | |
| 2007/0077936 | A1 | 4/2007 | Tomisawa et al. | |
| 2008/0205317 | A1 | 8/2008 | Piipponen et al. | 370/311 |
| 2008/0232335 | A1 | 9/2008 | Del Prado Pavon | |
| 2010/0142493 | A1 | 6/2010 | Sakoda | |
| 2010/0142505 | A1 | 6/2010 | Hansen et al. | 370/338 |
| 2012/0008599 | A1 * | 1/2012 | Marin | H04W 74/006 370/336 |

FOREIGN PATENT DOCUMENTS

| | | | |
|---|---|---|---|
| EP | 1714442 | B1 | 10/2006 |
| EP | 1826952 | A1 | 8/2007 |
| KR | 1020040055083 | | 6/2004 |
| WO | WO-02/071650 | A1 | 9/2002 |
| WO | WO-03063539 | | 7/2003 |
| WO | WO-2004107680 | | 12/2004 |
| WO | WO-2005/076544 | A1 | 8/2005 |
| WO | WO-06/040390 | | 4/2006 |

OTHER PUBLICATIONS

B. Crow et al.; "IEEE 802.11 Wireless Local Area Networks"; IEEE Communications Magazine; Sep. 1997; pp. 116-126.

* cited by examiner

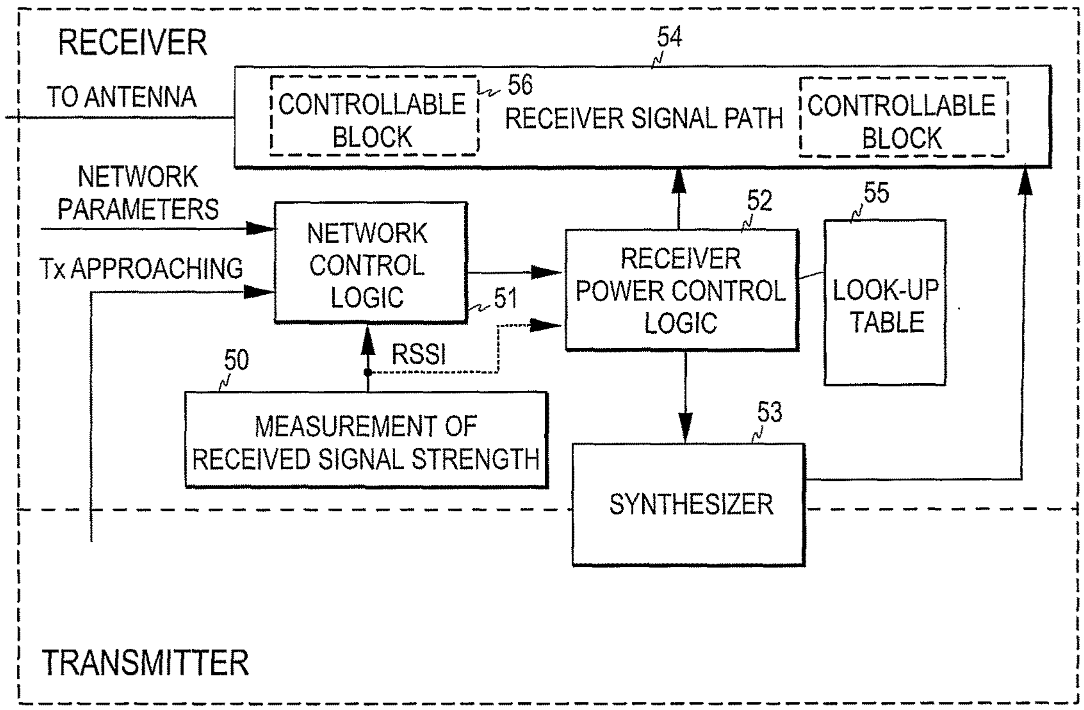
FIG. 5
FIG. 8
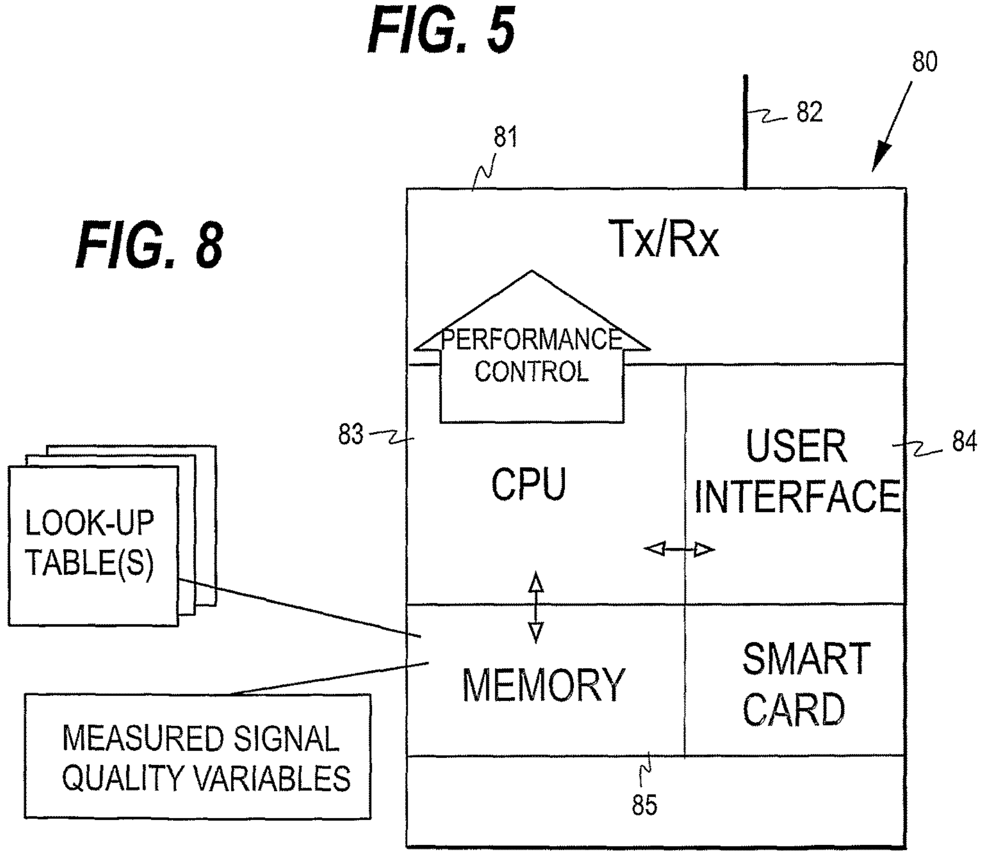

REDUCTION OF POWER CONSUMPTION IN WIRELESS COMMUNICATION TERMINALS

FIELD OF THE INVENTION

The invention relates generally to the reduction of power consumption in wireless communication terminals. More particularly, the present invention concerns a mechanism for decreasing power consumption through control of receiver performance in wireless terminals.

BACKGROUND OF THE INVENTION

The current development towards truly mobile computing and networking has brought on the evolvement of various access technologies that also provide the users with access to the Internet when they are outside their own home network. At present, wireless Internet access is typically based on either short-range wireless systems or mobile networks, or both.

Short-range wireless systems have a typical range of one hundred meters or less. They often combine with systems wired to the Internet to provide communication over long distances. The category of short-range wireless systems includes wireless personal area networks (PANs) and wireless local area networks (WLANs). They have the common feature of operating in unlicensed portions of the radio spectrum, usually either in the 2.4 GHz Industrial, Scientific, and Medical (ISM) band or in the 5 GHz unlicensed band.

Wireless personal area networks use low cost, low power wireless devices that have a typical range of about ten meters. The best-known example of wireless personal area network technology is Bluetooth, which uses the 2.4 GHz ISM band. It provides a peak air link speed of one Mbps, and power consumption low enough for use in personal, portable electronics such as PDAs and mobile phones. Wireless local area networks generally operate at higher peak speeds of 10 to 100 Mbps and have a longer range, which requires greater power consumption.

Wireless LAN systems are typically extensions of a wired network, providing mobile users with wireless access to the wired network. Examples of wireless local area network technology include the IEEE 802.11a, which is designed for the 5 GHz unlicensed band, and uses orthogonal frequency division multiplexing (OFDM) to deliver up to 54 Mbps data rates; the 802.11b, which is designed for the 2.4 GHz ISM band and uses direct sequence spread spectrum (DSSS) to deliver up to 11 Mbps data rates; and the HIPERLAN Standard, which is designed to operate in the 5 GHz unlicensed band.

In wireless LAN technology, two basic network topologies are available for network configuration: an ad-hoc network and an infrastructure network. An ad-hoc network is formed by two or more independent mobile terminals without the services of a base station, i.e. in an ad-hoc network the terminals communicate on a peer-to-peer basis. An ad-hoc network is normally formed for temporary purposes. The infrastructure network, in turn, comprises one or more wireless base stations, called access points, which form part of the wired infrastructure. In a typical network of this type, all traffic goes through the access points, regardless of whether the traffic is between two terminals or a terminal and the wired network, i.e. the mobile terminals do not communicate on a peer-to-peer basis. The mobile terminals are provided with wireless LAN cards, whereby they can access the wired network or set up an ad-hoc network. In an infrastructure network an access point and at least one terminal is said to form a Basic Serving Set (BSS), while an ad-hoc network is also termed an Independent BSS (IBSS).

So far, wireless LAN technology has been used mainly in laptop computers, which are typically AC powered, but which may also be used in battery mode that provides a fairly high battery capacity. To prolong the life of the batteries, the WLAN standards define a specific power save mode into which the terminals may enter from an active mode in order to decrease their power consumption. In this mode the WLAN-specific power consumption is very low, but the terminals have to wake up (i.e. enter the active mode) periodically to receive regular beacon transmissions broadcast in the network. The beacon transmissions indicate, for example, whether there are incoming packets buffered for a terminal. If so, the terminal retrieves the packets, goes back to sleep, and wakes up again to listen to the next beacon transmission.

The current WLAN power management has been designed assuming that the terminal devices are laptop type computers featuring a relatively high battery capacity. Along with the generalization of various other types of personal communication devices, such as intelligent phones, having a smaller size and thus also a lower battery capacity than laptop computers, power consumption has, however, become a critical issue when new properties are designed for wireless systems and terminals. Emerging ad-hoc mode applications in which power consumption may be rather high further aggravate the problem. Examples of such applications are games played in small groups or business meetings in which large files may be shared (wirelessly) by the participants.

Power consumption of the WLAN terminals has normally been reduced by trying to maximize the time the terminals spend in the power save mode. However, this does not affect the power consumption in the active mode, whose proportion of overall time, i.e. percentage of time in active mode, is on the increase along the generalization of new functionalities.

The present invention seeks to accomplish a solution by means of which the power consumption of a terminal may be reduced in the active mode of the terminal in a WLAN-like communication system provided with an uncoordinated media access mechanism, i.e. in a system where the terminals have to sense the common air medium prior to transmission to see whether the medium is free.

SUMMARY OF THE INVENTION

The present invention seeks to devise a new mechanism for decreasing power consumption in wireless terminals operating in wireless communication systems where a common channel is to be listened to prior to transmission to determine if the channel is free.

In the present invention, a terminal selects the device(s) with which it will communicate and controls the performance of its receiver in two different control modes, namely in a reception control mode intended for listening to the selected device(s) and in a media access control mode intended for sensing the common air medium prior to its own transmission.

The performance control is carried out in a manner allowing performance degradation to translate into reduced power consumption. Preferred methods for controlling the performance of the receiver include control of the dynamic range and/or the sensitivity of the receiver. The dynamic range here refers to the input power range over which the receiver produces a useful output. Sensitivity in turn refers generally to the ability of the receiver to detect (weak) signals, i.e. degraded sensitivity diminishes the area from which devices may be detected. The concept of dynamic range contains the concept of sensitivity, since the low end of the dynamic range is governed by sensitivity. The performance of the receiver may be degraded especially in the reception control mode, and the degradation can in turn be implemented so that power consumption is reduced in the transceiver.

The terminal thus selects the device(s) with which it communicates each time. In an ad-hoc network, the selected device(s) typically form a subset of all possible communicating peers in the same network. The terminal further measures a signal quality variable from at least one of the selected device(s), each signal quality variable being indicative of the quality of the signal received from respective device. The quality variable is typically indicative of the strength of the received signal. If no transmission to the selected device(s) is required, the performance of the receiver of the terminal may be adjusted based on the signal quality variable(s) obtained based on the said device(s) only. Thus, if transmission is not required, the terminal may restrict the operation range of its receiver according to the signal(s) received from the said device(s). This allows the terminal to receive with degraded performance, i.e. with reduced power consumption, but it may also make the devices outside this area so-called hidden nodes, i.e. nodes that cannot be detected. When transmission is approaching, the terminal readjusts the performance of its receiver so that it may detect, when sensing the common medium, all such devices whose traffic the upcoming transmission may disturb. In this way the terminal may ascertain that the hidden node problem is not aggravated.

Thus one embodiment of the invention is the provision of a method for decreasing power consumption in a wireless communication terminal. The method includes the steps of selecting at least one communication device as a communicating peer in a wireless communication system and measuring a signal quality variable from at least one of the at least one communication device selected in the selecting step, each signal quality variable being measured based on a signal received from a respective one of the at least one communication device selected in the selecting step, whereby at least one signal quality variable is obtained. The method further includes the steps of adjusting receiver performance based on at least one of the at least one signal quality variable obtained in the measuring step, the adjusting step being performed for reducing power consumption while ensuring reception of respective signals from the at least one communication device selected in the selecting step, monitoring if the wireless communication terminal's own transmission is approaching, and readjusting receiver performance for determining the availability of the common air medium at a performance level enabling detection of transmitting communication devices within a coverage area of said own transmission, the readjusting step being performed when the monitoring step indicates that said own transmission is approaching.

In another embodiment, the invention provides a wireless terminal for a wireless communication system where terminals are required to determine the availability of the common medium prior to transmission. The wireless terminal includes selection means for selecting at least one communication device as a communicating peer in the communication system and first measurement means for measuring a signal quality variable from at least one of the at least one communication device, each signal quality variable being measured based on a signal received from a respective one of the at least one communication device, whereby at least one signal quality variable is obtained. The wireless terminal further includes first performance control means for adjusting receiver performance based on at least one of the at least one signal quality variable, thereby to permit the wireless communication terminal to receive respective signals from the at least one communication device with reduced power consumption, monitoring means for monitoring if the wireless terminal's own transmission is approaching, and second performance control means for adjusting receiver performance to a performance level enabling the terminal to detect transmitting communication devices within a coverage area of said own transmission, the second performance control means being configured to operate when the monitoring means indicate that said own transmission is approaching.

In a still further embodiment, the invention provides a computer useable medium having computer readable program code embodied therein to control a wireless communication terminal. The computer readable program code includes a first computer readable program code portion for causing at least one communication device to be selected as a communicating peer for the wireless communication terminal and a second computer readable program code portion for causing the wireless communication terminal to adjust receiver performance based on a signal quality variable measured based on a signal received from at least one of the at least one wireless communication device. The computer readable program code further includes a third computer readable program code portion for causing the wireless communication terminal to generate an indication when transmission is approaching and a fourth computer readable program code portion for causing the wireless communication terminal to adjust receiver performance to a level enabling the wireless communication terminal to detect transmitting communication devices within a coverage area of said own transmission, the fourth computer readable program code portion operating in response to the indication.

Since in a typical case the terminal has only one or at most a few communicating peers which are close to it, the performance of the receiver may be lowered significantly during listening periods. This in turn translates to significant power savings. Furthermore, the performance of the receiver may be degraded without aggravating the known hidden node problem that may lead to simultaneous transmissions (collisions) and to reduced throughput.

Other features and advantages of the invention will become apparent through reference to the following detailed description and accompanying drawings.

BRIEF DESCRIPTION OF THE DRAWINGS

In the following, the invention and many of its embodiments are described more closely with reference to the examples shown in FIG. 1 to 8 in the appended drawings, wherein:

FIG. 5 is a block diagram illustrating one embodiment of the control mechanism of the invention in a terminal;

FIG. 8 illustrates one embodiment of a terminal according to the invention.

DETAILED DESCRIPTION OF THE INVENTION

Figure 1:
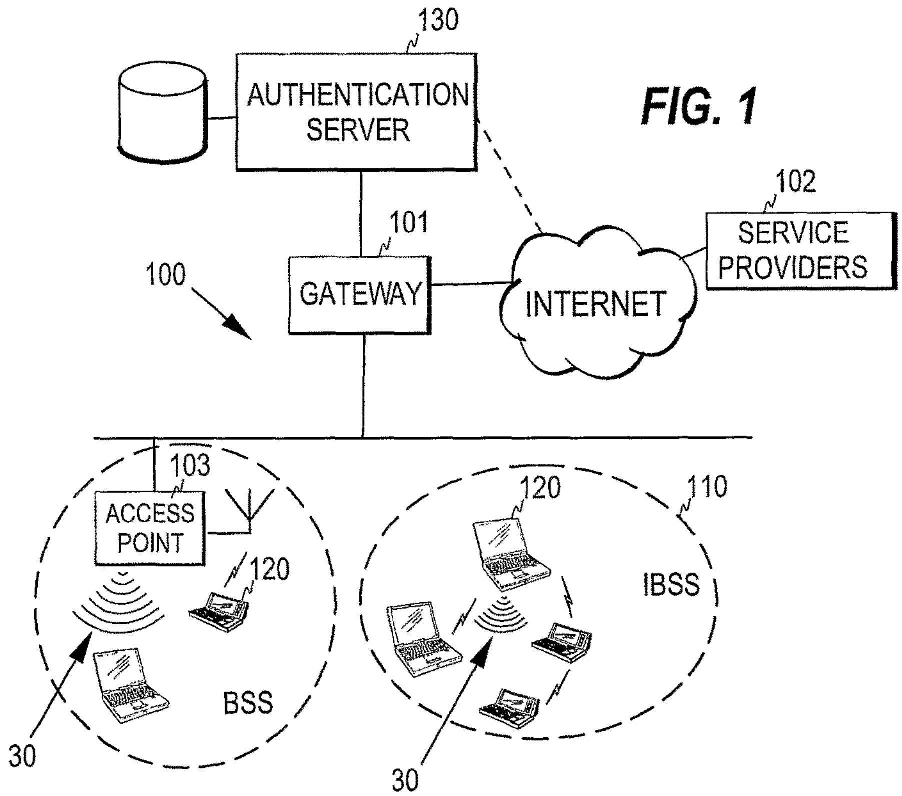
FIG. 1 illustrates a typical communication system according to the invention.

FIG. 1 illustrates a typical WLAN communication system. The system includes one or more WLAN networks 100, each connected by means of a gateway 101 (a router) to another network, such as the Internet, which contains service providers 102. Each WLAN network comprises one or more access points 103, each communicating wirelessly with the terminals within the coverage area, i.e. the cell, of the access point and thus forming a bridge between the terminals and the wired network.

As mentioned above, in an infrastructure network an access point and at least one terminal is said to form a Basic Service Set (BSS). A series of BSSs then forms an Extended Service Set (ESS). These BSSs are connected to each other by a Distribution System (DS), which can be a wired network, such as an Ethernet LAN, within which TCP/IP packets are transmitted, or a wireless network, or a combination of these two. However, the basic type of an IEEE 802.11 LAN is an Independent BSS (IBSS), which consists of two or more terminals. The terminals of an IBSS form an ad-hoc network 110.

The terminals of the invention are typically short-range wireless communication terminals, which may be based, for example, on the IEEE 802.11 standards for wireless local area networking. The terminals may be portable computers, PDA equipment, intelligent phones or other such mobile terminals 120. In the same way as an ordinary GSM telephone, the user-operated terminals may be made up of two parts: the actual subscriber device and an identity module, whereby from the viewpoint of the network the subscriber device becomes a functioning terminal only when the identity module has been inserted into it. The identity module may be a (Universal) Subscriber Identity Module ((U)SIM), User Identity Module (UIM) or a (User) Integrated Circuit Card ((U)ICC), for example. However, the terminals may equally well be traditional WLAN terminals in which no identity modules are used.

The system further typically contains an authentication server 130 of the WLAN network. The authentication server is connected to the above-mentioned gateway through a secured connection, which is typically a TCP/IP connection established through an operator network or through the Internet. As shown in the figure, in an infrastructure network the access points broadcast beacon messages 30, while in an ad-hoc network the terminals share this responsibility.

As the present invention does not relate to the architecture of the WLAN system, it is not discussed in more detail here.

In a communication system as described in FIG. 1, the terminals have to sense the medium before they can transmit, to ascertain that the medium is idle. For this purpose, the IEEE 802.11 standards include a Carrier Sense Multiple Access/Collision Avoidance (CSMA/CA) media access control (MAC) protocol to avoid simultaneous transmissions (i.e. collisions). A common problem related to an environment like this is the so-called hidden node problem, which occurs when two nodes can communicate with a third node but cannot communicate with each other due to a large distance, obstacles, etc. For example, a terminal may access the medium since it cannot hear another terminal which is currently communicating with an access point or a third terminal. In the present invention, power consumption is decreased through degradation of receiver performance without aggravating the hidden node problem.

Figure 2:
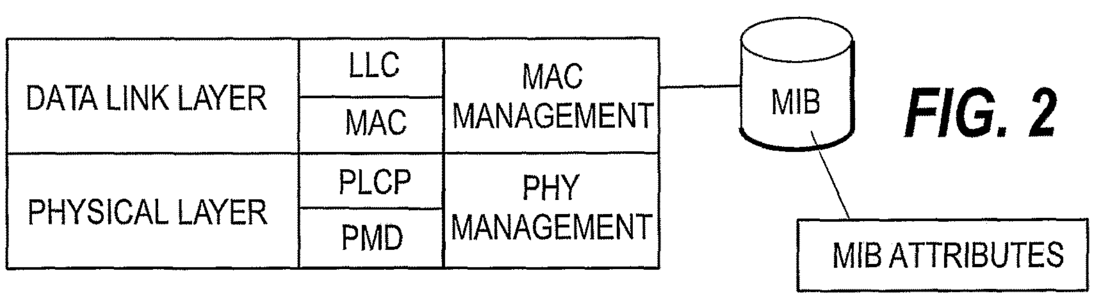
FIG. 2 illustrates the MAC entity utilized in IEEE 802.11 networks.

The IEEE 802.11 standards define the physical layer options and the MAC layer protocol for the wireless LAN. FIG. 2 illustrates the protocol architecture of the IEEE 802.11 standard. As shown in the figure, the actual MAC protocol operates in the lower sub-layer of the second layer of the OSI layer model, which is the Data Link Layer (DLL). The MAC management layer is responsible for the overall management of the MAC layer. It supports the association and roaming functionalities and controls the power saving functions, the authentication and encryption mechanisms, and synchronization of the terminals, for example. The MAC management layer further maintains a MAC layer management database, i.e. the MIB (Management Information Base) of the MAC layer. The MAC layer cooperates with the physical management layer to maintain the database. An example of the MAC layer attribute that may be utilized in the performance control mechanism of the invention is RSSI (Received Signal Strength Indicator), which indicates the level of the received signal. Alternatively, received signal strength may be defined internally in the physical layer implementation and used for the control mechanism of the invention without any connection to MAC protocols.

The physical layer is divided into two sub-layers, which are the PLCP (Physical Layer Convergence Protocol) sub-layer and the PMD (Physical Medium Dependent) sub-layer. The purpose of the PLCP is to provide minimum dependence on the PMD in order to simplify the interface between the physical layer and the MAC layer.

As discussed above, the performance of the receiver may be controlled by controlling its sensitivity or dynamic range. As these methods require slightly different measurements in the terminal, they are discussed separately below.

Figure 3:
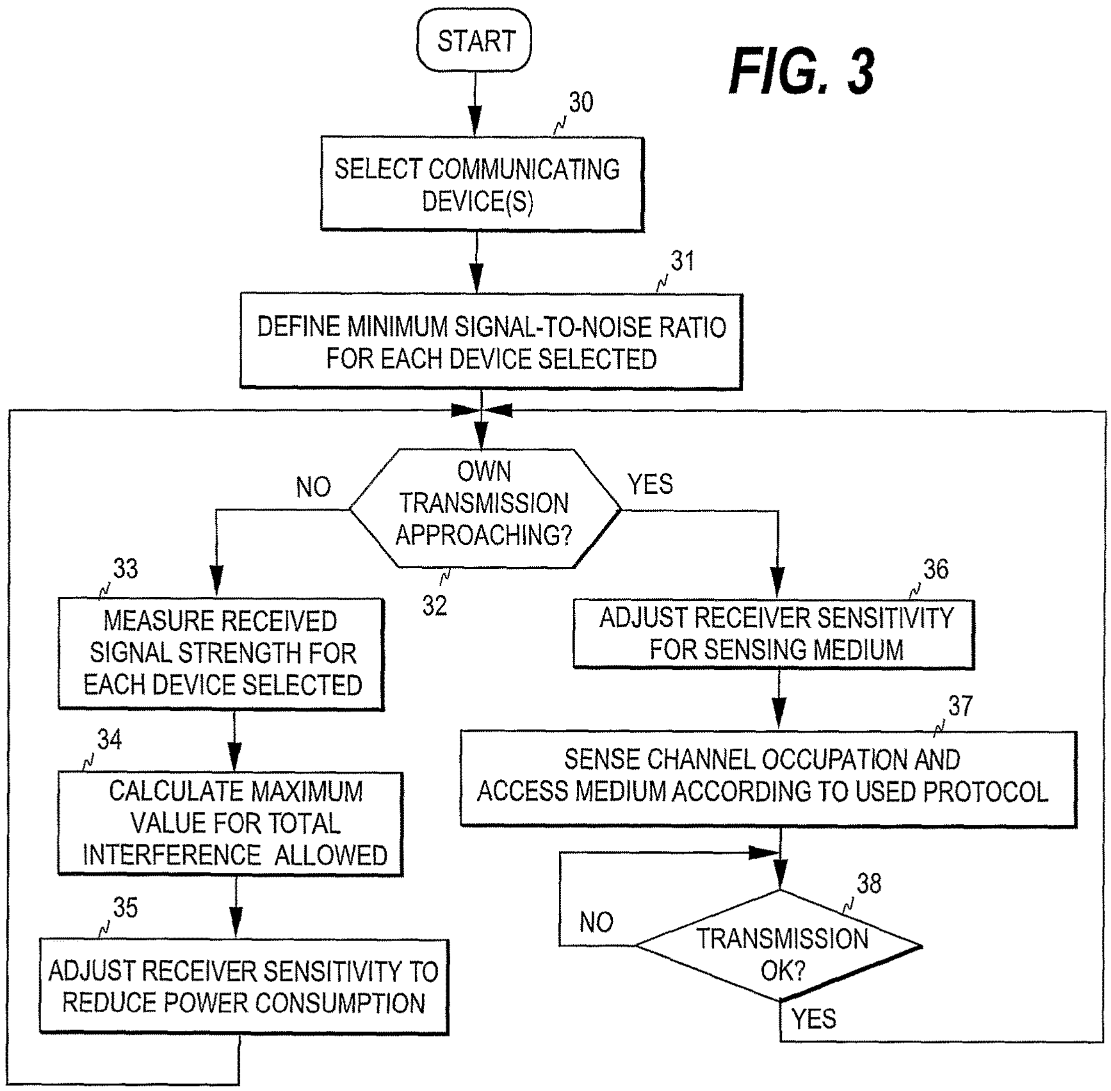
FIG. 3 is a flow diagram illustrating one embodiment of the control mechanism of the invention.

FIG. 3 is a flow diagram illustrating one embodiment of the performance control mechanism in a wireless communication terminal. In this embodiment, the performance control is carried out by controlling the sensitivity of the receiver. When operating in a network, such as a WLAN network, where terminals contend for the common air medium, the terminal first forms a dedicated communication group for itself by selecting one or more devices with which it needs to communicate and by establishing a communication link with each of the said devices (step 30). In an infrastructure network, only a neighboring access point is selected, while in an ad-hoc network the terminal may select one or more other terminals. The selection may be performed in various ways depending on the system involved. For example, the terminal may automatically detect the devices in the same network and present a list of the detected devices to the user, whereby the user may select the device(s) with which communication is preferred. The terminal may also include a pre-stored list of the devices in whose proximity the method of the invention is automatically initiated.

The terminal then defines a minimum signal-to-noise ratio for each of the selected devices, i.e. for each link (step 31). This is performed based on the link parameters to be used, such as the rate of the received data. If the link parameters to be used are not known, the minimum signal-to-noise ratio is defined assuming the worst case, i.e. the case in which the signal-to-noise ratio requirement is the highest possible.

Furthermore, a performance or safety margin is defined for each minimum value in order to guarantee reliable transmission over the link.

The terminal then decides whether the reception control mode or the media access control mode is to be entered. The decision is made based on whether or not the terminal needs to transmit soon (step 32).

If the terminal does not have to transmit but may stay in a listening mode, the received signal strength is measured for each link to be listened to. The measured signal strength represents the average level of the signal input to the receiver of the terminal from the link in question (step 33).

Based on the minimum signal-to-noise ratio, the associated performance margin, and the measured signal strength, the terminal then estimates the amount of maximum allowable total interference for each link separately (step 34). The ratio of the measured signal strength to the maximum allowable total interference then corresponds to a signal-to-noise ratio that exceeds the minimum signal-to-noise ratio by the said performance margin. The total interference here refers to receiver-originated interference, i.e. noise plus other unwanted components generated in the receiver.

Based on the estimation, the receiver sensitivity may then be degraded in order to reduce the reception power needed in the terminal (step 35). In other words, by degrading the sensitivity of the receiver the power consumption of the receiver is reduced to a lower value in view of the signal-to-noise ratio required. If the selected devices are to be listened to simultaneously, the sensitivity value is determined by the link with the tightest sensitivity requirement, i.e. the link for which the amount of maximum allowable total interference is the smallest. However, if the terminal can listen to each selected device in a dedicated time window, the sensitivity value for a time window is determined by the link in question, and the sensitivity is changed to a new link-specific value when the link to be listened to is changed. In this respect the operation thus depends on the network in question.

Since the local area networks are quite stable in short time periods, it is possible to degrade the sensitivity of the receiver based on the received signal strength value(s) measured from the device(s) with which communication is needed. If there are two or more such devices, the interference level requirement is defined separately for each device (link). However, the number of sensitivity levels used during listening periods depends on how many and which of the selected devices have to be listened to simultaneously.

In the above-described manner the terminal thus restricts the operation range of its receiver to correspond to the area covered by the selected device(s), which may make the devices outside this area hidden nodes. However, this is not detrimental to the operation of the system since the terminal has only been receiving so far.

When an own transmission is imminent, an indication of the need to transmit is generated and submitted to the process of the invention. As a result, the terminal enters the media access control mode in order to make all such devices "unhidden", which might be disturbed by the upcoming transmission (step 32/yes). The indication may be obtained, for example, from the transmission buffers when the transmitter starts to assemble a packet or frame to be transmitted. In the media access control mode, the receiver sensitivity is adjusted so that the terminal is able to detect all nodes with which a collision might occur in the upcoming transmission phase, i.e. the terminal makes all such nodes "unhidden". In one embodiment, receiver sensitivity is adjusted to a maximum value (step 36) in order to minimize the risk of hidden nodes. The channel occupation is then sensed and the medium is accessed according to the medium access protocol used in the system in question (step 37). In IEEE 802.11 networks, for example, the Carrier Sense Multiple Access/Collision Avoidance (CSMA/CA) media access protocol is used to share a common channel.

The transmission power may be adjusted according to the link in question. When the transmission has been completed successfully, the process returns to adjust the receiver sensitivity for the listening mode (steps 33 to 35).

In another embodiment of the invention, the sensitivity of the receiver is not adjusted to a maximum value at step 36, but to a lower value that depends on the link in question. Depending on the link parameters, the terminal may first define a transmission power value sufficient for that link. A propagation path loss model may be used to estimate the area within which the upcoming transmission may disturb other devices. The sensitivity of the receiver may then be adjusted to a level sufficient to detect all (transmitting) nodes within that area, i.e. in a cell in which the upcoming transmission may cause interference.

The above sensitivity control allows several very small cells to be formed, which do not interfere with each other and which do not disturb the operation of the access point. For example, several laptop/handset pairs may operate simultaneously without disturbing each other.

The group of communicating devices may be updated during the operation of the terminal. For example, the terminal may receive an indication that one of the selected devices enters or has entered sleep mode. If this link has been the one determining the sensitivity of the receiver, the sensitivity is changed according to the requirements of the rest of the selected devices. Furthermore, new devices may join the network and the terminal may select one or more of them to its communication group.

Figure 4:
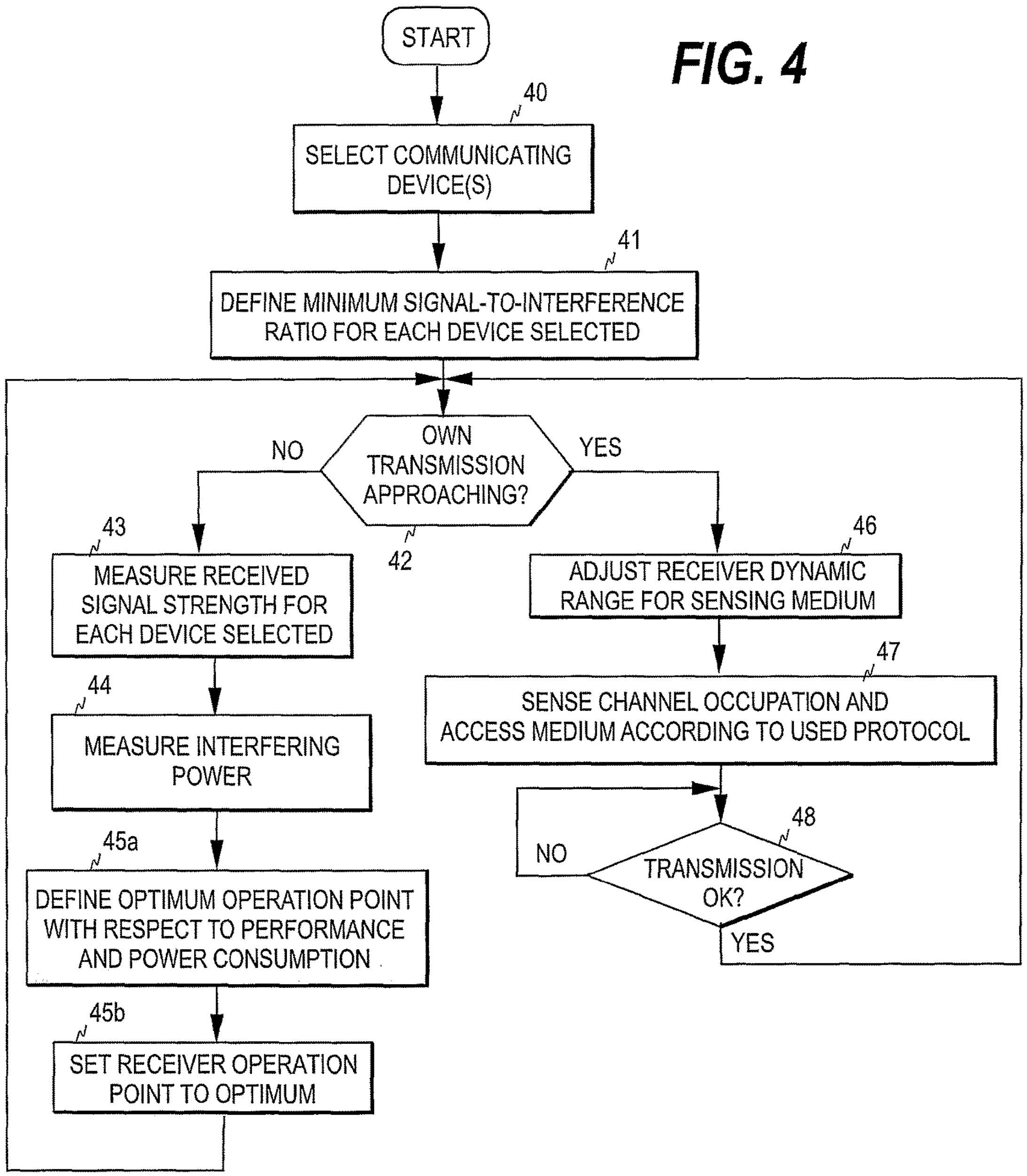
FIG. 4 is a flow diagram illustrating another embodiment of the control mechanism of the invention.

As discussed above, the power consumption of the transceiver may also be reduced by controlling the dynamic range of the receiver. FIG. 4 is a flow diagram illustrating one embodiment of the control mechanism for controlling the dynamic range of the receiver. The embodiment of FIG. 4 corresponds to that of FIG. 3, but in the two control modes discussed above the terminal controls the dynamic range of the receiver. In the reception control mode, the terminal measures the received signal strength for each link to be listened to (step 43), as in step 33 above. The terminal then measures the amount of interfering power indicative of the amount of external interference received by the receiver (step 44). In this embodiment, interference from outside interferers is thus taken into account.

The measured interfering power may be indicative of the total blocking power, i.e. the total power entering the active parts of the receiver, intermodulation power, or the power of an adjacent channel. Based on the minimum signal-to-interference ratio defined in step 41, the associated performance margin, the measured signal strength, and the measured power value(s), the terminal then defines an optimum operation point with respect to performance and power consumption (step 45*a*), and sets the operation point to said optimum value (step 45*b*). The term operation point here refers generally to the internal transceiver settings yielding the desired dynamic range and power consumption. As discussed below, the settings may involve supply voltage settings and/or bias current settings, for example.

When the media access control mode is accessed, the terminal adjusts the dynamic range of the receiver to a maximum value (step 46) or to a lower value sufficient to detect all (transmitting) nodes within the area in which the upcoming transmission may cause interference. As in the case of sensitivity control, the transmission determined for the upcoming transmission may be used in defining said lower value.

FIG. 5 is a block diagram illustrating one embodiment of the implementation of the performance control in a terminal. A measurement block 50 handles the measurement of the signal strength and supplies the measured value, such as RSSI, to a network control logic block 51, which calculates the maximum noise/interference allowed for the selected links. The network control logic may also receive other network parameters needed in the control process, such as the data rate used in the network. The calculated data is supplied to a receiver power control logic block 52, which defines the internal control measures to be taken to change the sensitivity or the dynamic range of the receiver so that reduced power consumption is achieved. The receiver power control logic block then controls the components in the receiver signal path 54 to obtain the desired sensitivity or dynamic range coupled with the desired power consumption. The receiver power control logic block may also control the synthesizer 53 of the transceiver, which also contains power consuming components. The indication of an approaching transmission may be given to the network control logic block, for example, which then controls the receiver power control logic to assume the media access control mode. The receiver may also be divided into controllable blocks 56. Each of the blocks may be controlled separately, as discussed below in connection with FIG. 6.

The receiver power control logic block may be provided with one or more look-up tables 55 which map the needed change in the sensitivity or dynamic range to the internal control mechanism to be used. It is also possible that the measured signal strength value is mapped directly to the internal control mechanism in the look-up table. Therefore, the measured signal strength value may also be supplied directly to the receiver power control logic, as indicated by a dashed arrow in the figure. The internal control mechanism thus indicates the operation points discussed above.

The sensitivity or the dynamic range of the receiver may be controlled in various ways depending on the structure of the receiver. Different blocks in the receiver signal path may be controlled to achieve the desired level of sensitivity or dynamic range coupled with desired power consumption. For example, the gain of a low-noise front-end amplifier (LNA) and/or the resolution of an analog-to-digital converter may be controlled. Circuit-level power save mechanisms that may be utilized in the present invention are described in U.S. Patent Applications US2003/0124999 A1 and US2003/0078007 A1. Generally, receiver power consumption may be reduced in a great number of ways. To give examples, power consumption may be controlled by changing various biasing currents or supply voltages in the receiver, by-passing one or more of the receiver stages, selecting a signal path with a lower/higher power consumption, and/or shutting down components with high power consumption. Especially the control of bias currents and the selection of different signal paths are effective techniques for reducing power consumption. The measurements needed for the control may be made either with analog domain power detectors or with digital measurement structures. They provide the necessary information to the control logic that steers the power consumption of receiver blocks.

Figure 6:
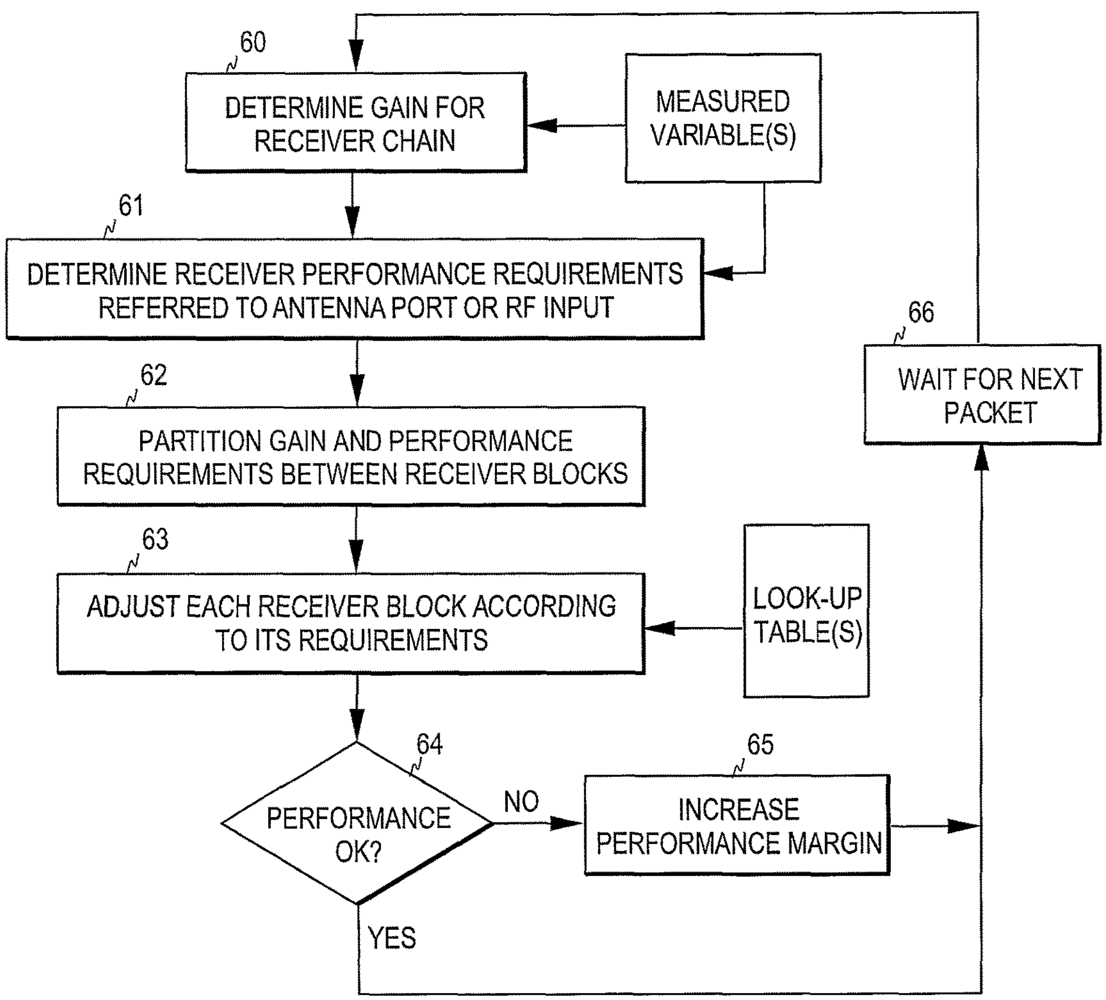
FIG. 6 is a flow diagram illustrating one embodiment of a control mechanism for controlling the performance of the receiver in the reception control mode.

FIG. 6 illustrates one embodiment of a control mechanism for controlling the performance of the receiver in the reception control mode. In this embodiment, the variable(s) measured based on received packets are first used to determine the gain of the receiver chain (step 60) and other receiver performance requirements referred to the antenna port or the RF input of the terminal (step 61). As discussed above, the variable(s) to be measured depend on whether sensitivity or dynamic range is controlled. In both embodiments, the received signal strength is measured, and the interfering power is additionally measured in the case of dynamic range control. The receiver is divided into several controllable blocks and the gain and receiver requirements are then partitioned between different receiver blocks at step 62. Each receiver block may then be controlled according to its requirements (step 63). The internal control information may again be retrieved from one or more look-up tables, for example. Each controllable block may include one or more low-noise amplifiers, down-conversion mixers, baseband or IF amplifiers, analog-to-digital converters, local oscillator buffers, or voltage controlled oscillators. As discussed above, the synthesizer of the transceiver may also be controlled to reduce power consumption.

The terminal then checks if the set performance level is sufficient, i.e. if packets are received correctly (step 64). If this is the case, the terminal waits for the next packet (step 66) and repeats the above steps, i.e. measures the variables and controls the different receiver blocks according to their requirements. If the performance is not sufficient, the terminal increases the performance margin (step 65) and waits for the next packet before repeating the above steps.

Figure 7:
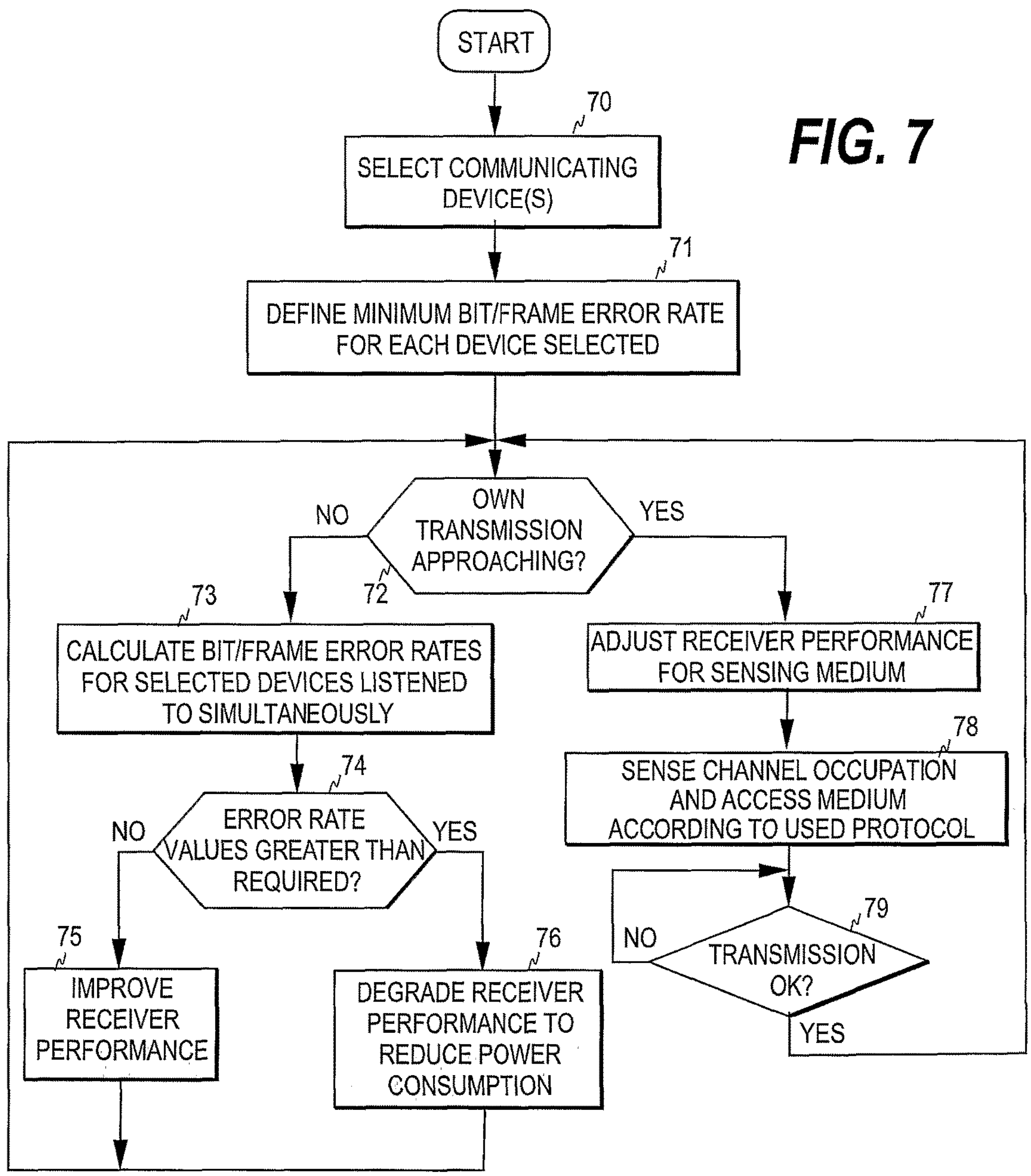
FIG. 7 is a flow diagram of a further embodiment of the invention.

FIG. 7 illustrates an embodiment of the invention, in which error rate is used as the signal quality variable measured from the selected device(s). In this embodiment, a minimum bit or frame error rate is defined for each of the selected devices, i.e. for each link (step 71). In the reception control mode, the terminal then calculates the bit or frame error rate value for those selected devices that are to be listened to simultaneously (step 72). If the calculated error rates are greater than the corresponding minimum values, the performance of the receiver, such as receiver sensitivity, may be degraded to reduce power consumption (step 76). The performance may be degraded based on the device, whose error rate is closest to the respective minimum value. If any of the error rate values is below the corresponding minimum value, the performance of the receiver is improved (step 75). The media access control mode is similar to that discussed in connection with FIG. 3.

FIG. 8 illustrates the basic elements of the mobile terminal according to one embodiment of the invention. The mobile terminal 80 comprises a transceiver 81 provided with at least one antenna 82, a control unit 83, user interface means 84 for creating a user interface through which the user can operate the terminal, and memory means 85, which may include one or more smart cards 86, such as one of the above-mentioned identity modules. However, as discussed above, an identity module is not included in a traditional WLAN terminal. The control unit performs the above-described control functions of the invention, i.e. it contains the control logic blocks shown in FIG. 5 and controls the transceiver as shown by an arrow in the figure. The memory means include the MAC MIB or a similar database, which may include the control information needed for the performance control, such as the measured signal strength or error rate values, and the look-up table(s) indicating the internal control operations for controlling the performance and the power consumption according to the measured signal quality variables. The control unit obtains the signal quality variables from the transceiver and stores them in the memory.

The data processing environment of the control unit may resemble that of an ordinary PC, and if an existing wireless terminal is provided with suitable interfaces for receiver sensitivity control, the control mechanism of the invention may be introduced separately into an existing terminal, for example in a multimedia card. It is also possible that the control mechanism, i.e. the program code that causes the control unit to control the performance of the receiver in the above-described manner, is delivered as a separate plug-in software module which may be downloaded to the terminal via the network.

The above-described embodiments for controlling the sensitivity and the dynamic range of the receiver may also be combined so that sensitivity is controlled when there are no strong external interferers and dynamic range is controlled when such interferers exist in the neighborhood of the terminal.

Although the invention was described above with reference to the examples shown in the appended drawings, it is obvious that the invention is not limited to these, but may be modified by those skilled in the art without departing from the scope and spirit of the invention. As discussed above, the invention may be utilized in any networks in which a media access control mechanism includes a function resembling the IEEE 802.11 Distributed Coordination Function (DCF). The invention may therefore also be used in systems having a centralized media access control, if the centralized control is not used unceasingly. Furthermore, different physical transmission techniques, such as Ultra Wide-Band (UWB) or Bluetooth, may be used in such networks. The performance of the receiver may also be controlled in any manner allowing performance degradation to be implemented so that transceiver power consumption is reduced.

The invention claimed is:

1. A method performed by a wireless communication terminal comprising:

selecting a plurality of peer wireless communications terminals in an ad-hoc wireless communications system based on user input;

determining a signal quality variable to each link for the selected plurality of peer wireless communications terminals based on link parameters;

determining if there is a need to transmit by the wireless communications terminal to one of the selected plurality of peer wireless communications terminals;

in response to determining there is no need for transmission, entering the wireless communications terminal to a listening mode, in which mode the wireless communications terminal does not transmit to any of the selected plurality of peer wireless communications terminals and adjusts receiver sensitivity of the wireless communications terminal by degrading the receiver sensitivity based on the link with tightest sensitivity requirement to decrease power consumption while ensuring reception of respective signals from the selected plurality of peer wireless communications terminals; and in response to determining there is need for transmission, entering the wireless communications terminal to a media access control mode, in which mode the wireless communications terminal transmits to at least one of the peer wireless communications terminals, defines a transmission power value for the link based on the link parameters and adjusts receiver sensitivity of the wireless communications terminal by increasing the receiver sensitivity based on the link parameters to a sensitivity level enabling detection of other transmitting communication devices within a coverage area of the transmission;

in response to receiving an indication that one of the selected plurality of peer wireless communications terminals enters sleep mode, adjusting receiver sensitivity of the wireless communications terminal according to requirements of at least one other of the selected plurality of peer wireless communications terminals not entering sleep mode.

2. The method of claim 1, further comprising:

automatically detecting peer wireless communications terminals in same ad-hoc wireless communication system; and generating a list of the detected terminals for user selection.

3. The method of claim 1, further comprising:

maintaining a pre-stored list of peer wireless communications terminals; and automatically selecting a peer wireless communications terminal based on the pre-stored list.

4. The method of claim 1, further comprising:

in response to the transmission in the media access control mode completed successfully, returning back to the listening mode to adjust the receiver sensitivity.

5. The method of claim 1, further comprising:

adjusting dynamic range together with the receiver sensitivity in the listening mode and the media access control mode.

6. The method of claim 1, wherein a measurement block of the wireless communications terminal handles measurement of signal strength for determining signal quality variable and supplies measured value to a network control logic block, which calculates maximum noise/interference allowed for the selected link to provide calculated data.

7. The method of claim 6, further comprising:

receiving, by the network control logic block, other network parameters comprising at least data rate used in the ad-hoc network.

8. The method of claim 7, further comprising:

providing the calculated data to a receiver power control logic block, which defines internal control measures to be taken to change sensitivity or dynamic range of the receiver so that reduced power consumption is achieved.

9. The method of claim 8, further comprising:

controlling, by the receiver power control logic block, components in a receiver signal path to obtain desired sensitivity or dynamic range coupled with desired power consumption.

10. The method of claim 9, further comprising:

controlling, by the receiver power control logic block, a synthesizer of a transceiver of the wireless communications terminal.

11. The method of claim 6, further comprising:

receiving by the network control logic block, an indication of an approaching transmission, and controlling, by the network control logic block, a receiver power control logic to change to the media access control mode.

12. The method of claim 1, wherein the receiver is configured to be divided into controllable blocks, each of the blocks configured to be controlled separately to achieve a desired level of sensitivity or a dynamic range coupled with a desired power consumption, and the method further comprising:

controlling at least one of the following:

gain of a low-noise front-end amplifier (LNA) and/or resolution of an analog-to-digital converter;

biasing currents or supply voltages in the receiver;

by-passing of one or more of the receiver stages;

a signal path selection with a lower/higher power consumption; or shutting down components with high power consumption.

13. The method of claim 1, further comprising:

determining availability of common air medium using the sensitivity determined; and performing said own transmission using the determined transmission power based on determined availability of common air medium.

14. The method of claim 1, further comprising:

generating an indication of a need to transmit based on transmission buffers when a transmitter starts to assemble a packet or a frame to be transmitted; and in response to the indication, entering the wireless communications terminal to the media access control mode in order to make all such nodes unhidden that might be disturbed by an upcoming transmission.

15. The method of claim 1, further comprising:

defining interfering power received in a wireless communications terminal, the interfering power being indicative of a level of interference caused by external interferers, wherein the adjusting comprise adjusting dynamic range of the receiver.

16. The method of claim 1, wherein the signal quality variable measured is indicative of signal strength received from the peer wireless communications terminal, and the method further comprising:

determining a device-specific signal-to-noise-ratio for the peer wireless communication terminal, the device-specific signal-to-noise-ratio indicating a signal-to-noise ratio value required to listen to the peer wireless communications terminal, wherein the determining comprises determining the device-specific signal-to-noise ratio for the peer wireless communications terminal by calculating a minimum signal-to-noise ratio for the peer wireless communications terminal and adding a predetermined safety margin to the minimum signal-to-noise ratio.

17. The method of claim 1, wherein the wireless communications terminal in the ad-hoc wireless communications system comprises at least the following:

a transceiver for receiving and transmitting information in the ad-hoc wireless communication system; and at least one processor and at least one memory comprising computer program code, wherein the at least one memory and the computer code are configured, with the at least one processor, to cause the wireless communications terminal to at least perform the method.

18. A computer program product embodied on a non-transitory computer useable medium comprising computer readable program code embodied therein to control a wireless communications terminal, the computer readable program code comprising code that when executed enables the wireless communications terminal to at least perform the method of claim 1.

19. A method in a wireless communications terminal for decreasing power consumption, comprising:

selecting a peer wireless communications terminal and a plurality of peer wireless communications terminals in an ad-hoc wireless communications system based on user input;

determining a signal quality variable based on link parameters to a link for the selected peer wireless communications terminal and to each link for the selected peer wireless communications terminals;

determining if there is a need to transmit by the wireless communications terminal;

in response to determining there is no need for transmission, entering the wireless communications terminal to a listening mode, in which mode the wireless communications terminal does not transmit to the peer wireless communications terminal nor to any of the peer wireless communications terminals and adjusts receiver sensitivity of the wireless communications terminal by degrading the receiver sensitivity based on both the signal quality variable to decrease power consumption while ensuring reception of respective signals from the peer wireless communication terminal, and the link with tightest sensitivity requirement to decrease power consumption while ensuring reception of respective signals from the peer wireless communications terminals;

in response to determining there is need for transmission, entering the wireless communications terminal to a media access control mode, wherein the mode defines a transmission power value for the link based on the link parameters and adjusts receiver sensitivity of the wireless communications terminal by increasing the receiver sensitivity based on the link parameters to a sensitivity level enabling detection of other transmitting communication devices within a coverage area of the transmission, and in which mode the wireless communications terminal transmits to the peer wireless communications terminal, or at least one of the peer wireless communications terminals, or both;

receiving an indication that one of the selected peer wireless communications terminals enters a sleep mode; and adjusting receiver sensitivity of the wireless communications terminal according to requirements of at least one selected peer wireless communications terminal not entering the sleep mode.

20. The method of claim 19, wherein the wireless communications terminal in the ad-hoc wireless communications system comprises at least the following:

a transceiver for receiving and transmitting information in the ad-hoc wireless communication system; and at least one processor and at least one memory comprising computer program code, wherein the at least one memory and the computer code are configured, with the at least one processor, to cause the wireless communications terminal to at least perform the method.

21. A computer program product embodied on a non-transitory computer useable medium comprising computer readable program code embodied therein to control a wireless communications terminal, the computer readable program code comprising code that when executed enables the wireless communications terminal to at least perform the method of claim 19.

22. The method of claim 19, further comprising:

automatically detecting peer wireless communications terminals in same ad-hoc wireless communication system; and generating a list of the detected terminals for user selection.

23. The method of claim 19, further comprising:

maintaining a pre-stored list of peer wireless communications terminals; and automatically selecting a peer wireless communications terminal based on the pre-stored list.

24. The method of claim 19, further comprising:
in response to the transmission in the media access control mode completed successfully, returning back to the listening mode to adjust the receiver sensitivity.

25. The method of claim 19, further comprising:
adjusting dynamic range together with the receiver sensitivity in the listening mode and the media access control mode.

26. The method of claim 19, wherein a measurement block of the wireless communications terminal handles measurement of signal strength for determining signal quality variable and supplies measured value to a network control logic block, which calculates maximum noise/interference allowed for the selected link to provide calculated data.

27. The method of claim 26, further comprising:
receiving, by the network control logic block, other network parameters comprising at least data rate used in the ad-hoc network.

28. The method of claim 27, further comprising:
providing the calculated data to a receiver power control logic block, which defines internal control measures to be taken to change sensitivity or dynamic range of the receiver so that reduced power consumption is achieved.

29. The method of claim 28, further comprising:
controlling, by the receiver power control logic block, components in a receiver signal path to obtain desired sensitivity or dynamic range coupled with desired power consumption.

30. The method of claim 29, further comprising:
controlling, by the receiver power control logic block, a synthesizer of a transceiver of the wireless communications terminal.

31. The method of claim 26, further comprising:
receiving by the network control logic block, an indication of an approaching transmission, and
controlling, by the network control logic block, a receiver power control logic to change to the media access control mode.

32. The method of claim 19, wherein the receiver is configured to be divided into controllable blocks, each of the blocks configured to be controlled separately to achieve a desired level of sensitivity or a dynamic range coupled with a desired power consumption, and the method further comprising:
controlling at least one of the following:
gain of a low-noise front-end amplifier (LNA) and/or resolution of an analog-to-digital converter;
biasing currents or supply voltages in the receiver;
by-passing of one or more of the receiver stages;
a signal path selection with a lower/higher power consumption; or
shutting down components with high power consumption.

33. The method of claim 19, further comprising:
determining availability of common air medium using the sensitivity determined; and
performing said own transmission using the determined transmission power based on determined availability of common air medium.

34. The method of claim 19, further comprising:
generating an indication of a need to transmit based on transmission buffers when a transmitter starts to assemble a packet or a frame to be transmitted; and
in response to the indication, entering the wireless communications terminal to the media access control mode in order to make all such nodes unhidden that might be disturbed by an upcoming transmission.

35. The method of claim 19, further comprising:
defining interfering power received in a wireless communications terminal, the interfering power being indicative of a level of interference caused by external interferers, wherein the adjusting comprise adjusting dynamic range of the receiver.

36. The method of claim 19, wherein the signal quality variable measured is indicative of signal strength received from the peer wireless communications terminal, and the method further comprising:
determining a device-specific signal-to-noise-ratio for the peer wireless communication terminal, the device-specific signal-to-noise-ratio indicating a signal-to-noise ratio value required to listen to the peer wireless communications terminal, wherein the determining comprises determining the device-specific signal-to-noise ratio for the peer wireless communications terminal by calculating a minimum signal-to-noise ratio for the peer wireless communications terminal and adding a predetermined safety margin to the minimum signal-to-noise ratio.

* * * * *